2,701,792

TREATMENT OF AQUEOUS LIQUIDS WITH BACTERIOSTATIC CARBON

William L. Owen, Baton Rouge, La.

No Drawing. Application June 21, 1950,
Serial No. 169,532

20 Claims. (Cl. 210—23)

The present invention relates to the purification of water and especially drinking water containing bacteria and micro-organisms.

In many plants using city water supplies, including beverage bottling plants, or water from any source, it is frequently necessary and, indeed, it is the usual practice to filter the water through activated adsorption carbon, the primary function of the activated carbon being to remove excess chlorine and incidentally to remove the bacteria and micro-organisms that may be present in the water being treated. It is the common experience in plants where the above process is practiced that the bacterial content of the water which has been filtered through the adsorption activated carbon is much higher than the original water. This phenomenon has been explained on the assumption that during the removal of the chlorine by the carbon the chlorine exerts an oxidation action. However, it has been discovered that even in unchlorinated drinking waters the growth of micro-organisms at the surface of the carbon is higher than in the same water in the absence of the particles of adsorption carbon.

This stimulating effect of highly dispersed colloidal materials upon the growth of micro-organisms has long been known, and has been attributed to what is known as an "alleocatalytic effect." The theory offered to explain this phenomena is that when the cells of micro-organisms are adsorbed on colloidal surfaces, the proximity of one cell to the other stimulates the growth of the micro-organisms. In support of this theory is the fact that it is difficult to propagate any species of bacteria from single cells. In accordance with the present invention, it has been ascertained that the number of bacteria in various waters filtered through activated adsorption carbon is consistently higher than in the water before filtration. It has also been discovered that the ability of the filtering surfaces of activated adsorption carbon to promote the initial colonization and development of micro-organisms may be reduced, and in certain cases substantially inhibited, by treating the carbon with a material having bacteriostatic properties, the activated carbon being impregnated with the bacteriostatic substance in a manner to avoid the excessive concentration of the bacteriostatic substance in certain layers of the adsorption carbon. In other words, in one form of the present invention, excessive concentration of the bacteriostatic material on the surfaces of the activated adsorption carbon is prevented. The discovery has been made that if the adsorption carbon is treated with a relatively dilute solution of the material having bacteriostatic properties, the surfaces of the particles of the activated adsorption carbon carry a uniform deposit of the bacteriostatic material.

In one form of the present invention there is provided a method of filtering water through activated adsorption carbon after the latter has adsorbed thereon a compound soluble in water and having a metal radical which confers on the compound bacteriostatic properties, as hereinafter pointed out in detail, said compound preferably having an acid radical which when the water is to be used for drinking purposes or for food purposes is incapable of making the water objectionable for said purposes. More particularly, the compound used for treatment of the adsorption carbon may be any compound soluble in water, the metal radical of which decreases or inhibits the development of micro-organisms in water after treatment with activated adsorption carbon.

More specifically the water may be treated with or filtered through activated adsorption carbon, the latter having adsorbed therein a metal compound, the metal radical of which may be selected from the group consisting of aluminum, iron, copper, cobalt, nickel, manganese and zinc. The metal radical may be a sulfate radical or a chloride radical. Usually, the acid radical is one which insures the best solubility of the metal compound in water. Copper sulfate is used as the bacteriostatic medium for impregnating the activated adsorption carbon in small quantities because it is more soluble than the chloride. On the contrary, cobalt chloride is used to prepare the unique activated adsorption medium which is used in accordance with the present invention because cobalt chloride is more soluble in water than cobalt sulfate.

In accordance with the present invention, the best results are obtained when the activated adsorption carbon carries cobalt as the bacteriostatic metal, the cobalt preferably being present on the adsorption carbon in the form of a dry or anhydrous salt which was initially soluble in water. While all of the above metals have a bacteriostatic effect when present in adsorption carbons which are used for the treatment of water, said metals decreasing the development of micro-organisms in the water after the water has been treated or filtered through the activated adsorption carbon containing the metal, it has been discovered that cobalt is unique in effecting this result as it is only necessary that the adsorption carbon have an exceedingly small amount present to prevent or greatly inhibit the amount of microorganisms in the water after the water has been passed through the adsorption carbon to purify the water, as for example to remove the objectionable taste of water which has been previously chlorinated.

The bacteriostatic effect of the cobalt present in a cobalt compound which is soluble in water is so great as compared to other of the bacteriostatic agents hereinafter set forth that the adsorption carbons treated with any of the other metals or said metals in aqueous solution, as herein set forth, such as copper sulfate or copper chloride, which have ceased to function to reduce the development of micro-organisms in water may be regenerated by passing through the carbon a dilute aqueous solution containing a soluble cobalt compound which will deposit on the particles of the adsorption carbon and cause said regenerated activated adsorption carbon to function to inhibit or prevent the development of micro-organisms in water which is passed through the activated adsorption carbon to purify or otherwise confer properties upon the water as herein set forth in detail.

In accordance with the present invention, the adsorption carbon may be treated first with a dilute solution of a copper sulfate and then with a much greater dilute solution of an aqueous soluble cobalt salt, as for example cobalt chloride or cobalt sulfate, the chloride being preferred because of its greater solubility in water, said solution being a very dilute solution of the character herein set forth.

While broadly stated the activated adsorption carbon has adsorbed on the particles thereof between 0.5% and about 1.5% inclusive of the aqueous soluble metal compound, as for example a metal sulfate including copper sulfate which has present its water of crystallization, as pointed out the metal cobalt is unique in its bacteriostatic effect in carrying out the present invention, and there need only be present on the surfaces of the particles of the activated adsorption carbon between 400 parts and 2,000 parts per million parts by weight of the activated carbon. Expressed in percentages, this is between 0.04 and 0.20%. It may be stated that if the activated adsorption carbon contains .5% of dry substantially anhydrous copper sulfate, the water of crystallization being present in the copper sulfate, then there is present 5,000 parts of dry copper sulfate per million parts of activated adsorption carbon. Similarly, the presence of 15,000 parts of the dry copper sulfate corresponds roughly to 1.5% of the dry copper sulfate present on the surfaces of the particles of the activated adsorption carbon. In other words, whereas it takes from 5,000 parts to 15,000 parts of dry copper sulfate per million parts of activated adsorption carbon to prevent, for example, chlorinated water which is passed through the impregnated adsorption carbon from developing micro-organisms after the passage of the water through the adsorption carbons, it only takes between 400 and 2,000 parts of a compound containing bacteriostatic cobalt metal in combination with any radical which does not prevent the liquid which is treated from being used for drinking or food purposes, the cobalt and the other metals herein set forth being preferably combined with an acid radical such as a chloride or a sulfate because the cobalt when combined with these radicals is soluble in an aqueous solution. This is the function of the radical with which the cobalt is combined. The cobalt or the bacteriostatic metal herein set forth is responsible for the bacteriostatic effect and the radical with which it is combined simply functions to place this metal radical in such a form that the compound containing the metal radical is soluble in an aqueous solution.

The present invention is applicable to the treatment of waters in general including drinking water which has been chlorinated, sewerage water containing E-coli bacteria, and in general all waters which have present bacteria and micro-organisms.

As above pointed out, the best results are obtained when the activated adsorption carbon is impregnated using a large volume of a dilute aqueous solution of a bacteriostatic material, as for example cobalt chloride or cobalt sulfate. In other words, using the metal chloride as an illustrative example, it is best to treat the activated adsorption carbon with a dilute aqueous solution of a metal chloride instead of a concentrated aqueous solution thereof.

The aqueous treatment solution containing cobalt compound, or a nickel compound, or a manganese compound, or a zinc compound preferably has a concentration of the bacteriostatic material, as for example metal chloride between about 100 and 1,000 parts per million parts of water and preferably between about 100 and 500 parts per million parts of water by volume, although in some cases this may vary between 100 and 200 parts per million parts of water by volume. The same holds true for the sulfates of these metals. The activated adsorption carbon usually has adsorbed on the surfaces thereof a bacteriostatic substance, as for example a metal chloride in an amount between 400 and 2,000 parts of the dry metal chloride per million parts by weight of the dry activated adsorption carbon. The percentages herein set forth are equally applicable to the sulfate. The metal chloride or the metal sulfate as it appears on the surfaces of the activated adsorption carbon is substantially dry, although it contains its water of crystallization. As stated, the preferred chloride or sulfate is cobalt chloride or cobalt sulfate. Any of the cobalt chlorides or the cobalt sulfates may be used. The preferred cobalt chloride is the cobaltous chloride $CoCl_2.6H_2O$. The preferred cobalt sulfate is cobaltous sulfate $CoSO_4.7H_2O$. The preferred amount of bacteriostatic material adsorbed on the surfaces of the adsorption carbon may be about 400 parts per million parts of adsorption carbon taken on the weight of the dry adsorption carbon, when the bacteriostatic material is a compound of cobalt, nickel, manganese and zinc and particularly a cobalt compound. The range may be higher, as pointed out, when the bacteriostatic material is present in the form of a copper compound or aluminum compound, or iron compound.

The invention is also directed to a method comprising reducing the ability of the filtering surfaces of activated adsorption carbon to promote the initial colonization and development of micro-organisms comprising treating the adsorption carbon with a dilute aqueous solution of a metal chloride or sulfate having bacteriostatic properties, the latter being present in solution in an amount herein stated, and thereafter drying the so-treated activated adsorption carbon, the amount of the compound, as for example a metal chloride or sulfate, on the surfaces of the dry activated carbon being of the order herein set forth. When using cobalt chloride or any of the chlorides of the cobalt group which include manganese chloride, nickel chloride, zinc chloride, and of course cobalt chloride, the amount of the dry chloride present on the surfaces of the dry activated carbon may be between 400 parts and 2,000 parts of the dry metal chloride containing its water of crystallization per million parts of the dry activated carbon taken on the weight of the substantially anhydrous activated carbon.

The present invention in one of its forms is also directed to the production of activated adsorption carbon having substantially uniformly adsorbed on the particles of the dry carbon mass broadly between 100 and 15,000 parts or between 5,000 and 15,000 parts of the herein set forth dry metal compound, as for example metal chloride or sulfate, the metal of which has bacteriostatic properties, and more limitedly between 100 parts and 2,000 parts per million parts of the dry carbon of the herein set forth metal selected from the cobalt group of metals, namely cobalt, nickel, manganese, and zinc. More narrowly, the range for the cobalt group of metals may be between 400 and 2,000 parts per million parts of the activated dry adsorption carbon, the metal compounds of the bacteriostatic metal of course containing the water of crystallization where the adsorption carbons during their drying are dried at a temperature at which the bacteriostatic metal compounds maintain their water of crystallization.

It has been ascertained experimentally that the number of bacteria present in different waters filtered through activated carbon is consistently higher after filtration than before filtration. In many instances, a water having a count of 5 to 10 per cc. shows a bacterial count as high as 1,000 after remaining in contact with the carbon for only twenty-four hours. The following experiment, the data for which is set forth in Table I, illustrates the growth of bacteria in water in the presence and absence of activated adsorption carbon, the tests having been made with city water exposed for forty-eight hours maintained at a temperature of 34° C. In each test 100 cc. portions of city water having a residual chlorine content of 5 p. p. m. were introduced into the sterile bottles each having a capacity of 200 cc. Some of the bottles contained water only and were used as controls. In the other bottles, 20 grams of previously sterilized activated adsorption carbon known under the brand name of Hydrodarco were weighed, placed into the bottles, and the bottles and the carbon sterilized under a pressure of 15 pounds per square inch. After cooling, 100 cc. of the same water which is used in the controls was introduced into the bottles containing the sterilized carbon. Initial bacteria counts were made for the water and the activated carbon prior to the start of the experiment, these being termed "original count." Thereafter the bottles prepared as above set forth, some of the bottles containing merely control water, and some of the bottles containing control water and activated adsorption carbon were incubated at a temperature of 34° for forty-eight hours when a second bacteriological analysis was made. The results of these tests appear in the following Table I.

TABLE I

*Effect of untreated adsorption carbon upon rate of growth of microorganisms in water*

| Test No. | Original Count | | 48-hour Count | |
| --- | --- | --- | --- | --- |
| | Water | Activated Adsorption Carbon (Hydrodarco) | Water | Activated Adsorption Carbon (Hydrodarco) |
| I | 31 | 31 | 500 | 18,000 |
| II | 76 | 14 | 8,100 | 28,000 |
| III | 5 | 4 | 900 | 1,400 |

It is clear from the above table that the water which contained no activated adsorption carbon had in one instance a bacterial count of 500; in another instance a bacterial count of 8,100; and in another instance a bacterial count of 900. Specimens of the identically same water which had 20 grams of activated adsorption carbon added to 100 cc. of the water, and which had been incubated for a period of forty-eight hours showed respectively a count of 18,000; 28,000 and 1,400 bacteria.

In another series of experiments activated adsorption carbons, identical with those used in the first experiment, set forth in Table I, were impregnated with a dilute solution of cobalt chloride, said solution having 0.5 gram of cobalt chloride per liter of water. More specifically, a cobalt chloride solution of the very low concentration above set forth was filtered through 20 grams of the carbon and the latter dried. Some of the test bottles contained water only, others contained water plus untreated adsorption carbon and others contained water plus treated adsorption carbon.

TABLE II

*Effect of treated and untreated adsorption carbon upon the rate of growth of microorganisms in water*

| Test No. | Water Plus Untreated Adsorption Carbon (Hydrodarco) after 24 Hours (Original Count, 50 per cc.) | Water Plus Treated Adsorption Carbon (Hydrodarco) after 24 hours (original count, 35 per cc.) |
|---|---|---|
| I | 140 | 11 |
| II | 103 | 48 |
| III | 150 | 45 |

Referring to Table II, it is to be noted that the water exposed to untreated adsorption carbon had a count of from 103 to 150 bacteria per cc., while that exposed for the same length of time to the action of identical carbon treated with cobalt chloride had a count of only 48 as a maximum.

In every case the water which had been conditioned by treated adsorption carbon, as for example that merchandised under the brand name "Hydrodarco," showed a bacteria content much lower than the water which had been subjected to a treatment with untreated adsorption carbon.

In order to ascertain whether the aqueous cobalt chloride solution had its cobalt chloride-content removed by passage through the carbon, tests were made of the filtrate after varying amounts of the solution had passed through. The results of these tests are given in the following table:

TABLE III

*Adsorption capacities of activated adsorbent carbons for cobalt chloride (5 grams of carbon used)*

| Carbon Type | Cc. of aqueous Cobalt Chloride Solution having a concentration of 500 p. p. m. parts of water adsorbed by 5 grams of activated adsorption carbon | P. p. m. (parts per million) of Cobalt Chloride adsorbed on surfaces of adsorption carbon, per million parts by weight of carbon |
|---|---|---|
| A | 3 | 300 |
| B | 20 | 2,000 |
| C | 10 | 1,000 |
| D | 3 | 300 |

It will be understood from the above table that various types of adsorption carbons used for water purification vary substantially in their ability to adsorb cobalt chloride, and hence require varying amounts of the impregnating compounds to render the adsorption carbons bacteriostatic. While the full adsorption of the adsorption carbon surface with the bacteriostatic agent is not necessary, it is important to have the impregnating agent substantially uniformly distributed over the entire surface of the carbon particles.

Referring to Table III, carbon A is well protected by the adsorption of an aqueous solution containing 500 parts of cobalt chloride per million parts of water. When the water is driven off, then the carbon will contain 300 parts of dry cobalt chloride per million parts by weight of the adsorption carbon. Carbon B adsorbed 500 parts of the same treatment solution in order to confer bacteriostatic properties upon the adsorption carbon.

In order to test the plant efficiency of the present invention wherein water is treated and purified with carbon carrying bacteriostatic material, glass cylinders were filled with treated and untreated adsorption carbons and connected to the plant water supply. The water was allowed to run through the cylinders continuously for a month's time.

The test filter had a capacity of approximately one pound of carbon. The rate of flow through the glass cylinders was adjusted to the same rate of flow per cubic foot of adsorption carbon as the rate of flow of the water through the plant carbon filter. The experimental filter was used continuously over a period of weeks without backwashing as contrasted to the daily backwashing of the plant filter. In many cases, the water would remain in contact with the adsorption carbon in the experimental period over a period of days which would tend to provide ideal conditions for the growth of microorganisms. Every conceivable opportunity was provided under these conditions by the multiplication of microorganisms. A comparison of the results obtained practicing the present invention and using cobalt treated carbon, with the results obtained using the regular plant filter, is set forth in the following table:

TABLE IV

| Period of Treatment in days | Bacteria Count per cc. of Water | | |
|---|---|---|---|
| | Entering Test Filter | After Treatment with Carbon Containing Cobalt Chloride | After Passing Through Plant Filter Containing Untreated Adsorption Carbon |
| First day | 80 | 74 | 180 |
| Do | 89 | 83 | 150 |
| Do | 95 | 120 | 200 |
| Sixth day | 110 | 184 | 223 |
| Do | 86 | 100 | 120 |
| Do | 93 | 107 | 150 |
| Do | 85 | 79 | 200 |
| Do | 80 | 119 | 193 |
| Seventh day | 90 | 80 | 175 |
| Do | 63 | 78 | 110 |
| Ninth day | 158 | 83 | 149 |
| Do | 111 | 88 | 128 |
| Do | 108 | 93 | 137 |
| Thirteenth day | 68 | 86 | 130 |
| Do | 35 | 107 | 150 |
| Do | 55 | 95 | 138 |
| Do | 78 | 51 | 109 |
| Do | 67 | 82 | 138 |
| Fifteenth day | 50 | 123 | 186 |
| Do | 73 | 94 | 173 |
| Do | 60 | 84 | 160 |
| Do | 74 | 64 | 130 |
| Do | 58 | 76 | 134 |
| Twentieth day | | 111 | 200 |
| Twenty-first day | | 152 | 200 |
| Twenty-third day | | 94 | 159 |

Referring to Table IV, it is seen that the bacterial count of microorganisms present in the water which had been passed through the treated carbon was consistently lower than the bacterial count of the water which was in and had been passed through the plant filter, and more often than otherwise at the same level of bacterial concentration as the water that was fed to the plant filter. It must be taken into consideration also that in the plant filter the adsorption carbon was "backwashed" every twenty-four hours, that is to state, the flow of the water was reversed so that the fine carbon and suspended matter would be washed from the carbon surfaces, said washings being discharged to the sewer. It is to be noted that the experimental filter containing the carbon treated with cobalt chloride solution was in use over a month and yet the efficiency of the adsorption carbon was as good at the end of that period as at the beginning of the test period.

In another experiment, the same type of experimental filter was connected to city water having a chlorine content of 0.5 p. p. m. and a very low initial bacterial count per cc. This water was permitted to flow continuously and the bacterial count taken on the effluent. The results thereof are set forth in the following table:

TABLE V

| Period of Treatment in days | Water Entering Filter (2 bacteria per cc.) | |
|---|---|---|
| | Control Carbon | Treated Carbon |
| | Bacteria per cc. | Bacteria per cc. |
| 1st day | 2 | 3 |
| 2nd day | 15 | 14 |
| 3rd day | 4 | 1 |
| 5th day | 12 | 1 |
| 9th day | 80 | 12 |
| 10th day | 34 | 2 |
| 11th day | 22 | 4 |
| 12th day | 89 | 8 |
| 13th day | 90 | 1 |

In view of the fact that the influent water had a very low bacterial content, the control and the treated carbon filters were then filled with a mixture of city water contaminated with surface water, to bring its bacterial count to 400 per cc. and this water was left in contact with the carbon for 12 hours, when the city water was again allowed to flow through. The counts were then taken as before.

TABLE VI

| Period of Treatment in days | Bacteria per cc. in Water Containing— | |
|---|---|---|
| | Control Carbon | Treated Carbon |
| 0 | 400 | 400 |
| 1 | 300 | 300 |
| 2 | 91 | 30 |
| 3 | 63 | 6 |
| 4 | 80 | 12 |
| 5 | 90 | 1 |

It will be seen from the above table that even when the treated carbon filter is exposed to contaminated water, the count soon drops to normal levels, whereas that of the water from the control untreated carbon remains at fairly high levels.

It has been found that after untreated water purification carbons have been in use over a long period of time and have become highly contaminated with bacteria, they can be rendered efficient by impregnation with aqueous cobalt chloride solutions containing from 100 to 500 p. p. m. of the aforementioned salt. As an example, a filter containing untreated carbon was connected to a water line and operated continuously over a period of several weeks, during which time the effluent showed the following bacterial counts.

TABLE VII

| Period of time in days: | Bacteria per cc. |
|---|---|
| 3rd day | 147 |
| 3rd day | 175 |
| 3rd day | 146 |
| 3rd day | 129 |
| 3rd day | 234 |
| 3rd day | 340 |
| 4th day | 361 |
| | 318 |
| | 200 |
| 6th day | 634 |
| 6th day | 327 |
| 6th day | 219 |
| 6th day | 246 |
| 6th day | 163 |
| 6th day | 140 |
| 6th day | 111 |
| 6th day | 227 |
| 7th day | 308 |
| 7th day | 227 |
| 7th day | 192 |
| 7th day | 206 |
| 8th day | 420 |
| 8th day | 256 |

The carbon was then flushed with an aqueous cobalt chloride solution containing 500 parts of cobalt chloride per 1,000,000 parts of water and again put into operation with the following results:

TABLE VIII

| Period of time in days: | Bacteria per cc. |
|---|---|
| 1st day | 77 |
| 1st day | 3 |
| 1st day | 26 |
| 1st day | 6 |
| 2nd day | 32 |
| 2nd day | 16 |
| 3rd day | 31 |
| 3rd day | 24 |
| 4th day | 4 |
| 4th day | 4 |
| 4th day | 11 |
| 4th day | 6 |
| 5th day | 5 |
| 8th day | 1 |
| 8th day | 1 |
| 9th day | 2 |
| 9th day | 2 |
| 10th day | 6 |
| 10th day | 86 |
| 10th day | 2 |
| 10th day | 4 |
| 11th day | 9 |
| 11th day | 0 |
| 11th day | 5 |
| 15th day | 3 |
| 15th day | 1 |

The presence of adsorbed salt, for example cobalt chloride or cobalt sulfate, can be detected on the adsorption carbons treated as previously described, even after the carbon has been in use for relatively long periods of time. If one takes five grams of adsorption carbon treated to contain from 100 to 2,000 parts of dry cobalt chloride per million parts by weight of the dry adsorption carbon, adds 20 cc. of a mixture containing 10 cc. of a sodium carbonate solution and 10 cc. of hydrogen peroxide, then heats this mixture of adsorption carbon and reagent in a water bath to the boiling point, and thereafter filters off the adsorption carbon, the filtrate will have a green color, the depth of color depending upon the amount of cobalt. In testing carbons so treated and used for varying periods in water filters, it has been found that the cobalt chloride or cobalt sulfate is still present which clearly shows the tenacity with which the impregnating agent adheres to the carbon surfaces of the adsorption carbon.

It has been found that the adsorption carbon may be impregnated with any of the herein set forth bacteriostatic salts, as for example cobalt chloride or cobalt sulfate in various manners such as filtering the various aqueous cobalt chloride through the carbon or by mixing the particles of the carbon in a solution of the cobalt salt, as for example cobalt chloride, then filtering the mixture, and then drying the recovered carbon. However, the most efficient means for impregnation is to add to the carbon a solution of cobalt chloride having a concentration of 100 to 500 parts per million parts of water, and then allow the carbon particles to fall by gravity through the column of the impregnating agent. There is employed for this purpose a large glass cylinder approximately five feet in length open at both ends and having a diameter of 3⅛ inches. The bottom of the cylinder is closed with a tightly fitting rubber stopper. The cylinder is then placed in a specially constructed supporting rack which holds it in a vertical position. Two or three liters of an aqueous cobalt chloride solution having a concentration of between 100 and 500 parts per million parts of water are then introduced into the top of the cylinder after which the carbon to be treated is fed by increments into the solution. The carbon slowly gravitates to the bottom of the cylinder and after the full charge of one to two pounds settles on the bottom, the supernatant solution is removed by decantation, and the precipitated carbon removed at the bottom of the cylinder by removing the stopper from the lower part of the cylinder. The resulting adsorption carbon is then dried at a temperature of 110° C. which is set forth by way of illustration and not by way of limitation. The carbon may be dried by placing it over a furnace or by superheating the same, or by any conventional means of drying. The activated adsorption carbon after drying will contain the metal chloride in a substantially anhydrous condition, that is the water of crystallization has been removed. However, when the water to be treated is passed over the impregnated hydrocarbon, the metal chloride adsorbs this water of crystallization. The carbons which are used average 68% to 70% carbon and between 4.50% and 6.5% of ash. The adsorption carbon used should be relatively chemically inert towards the metal sulfate with which it is impregnated and which is present in an adsorbed state on the carbon particles. Further, the adsorption carbons should be relatively chemically inert towards the waters treated; in other words the carbons should not have any acids present as these acids change the pH of the water treated and the latter would then not be suitable for drinking purposes. The carbons should not contain any oxidizing agents. In illustration, if the carbon contains permanganate of potash the oxidizing effect of the latter would consume a substantial amount of the absorption capacity of the carbon and greatly depreciate its use as an adsorbant of chlorine present in the waters treated.

The carbons which are used in carrying out the present invention are the usual adsorption carbons used to immobilize or fix the excess chlorine content in chlorinated waters. The carbons are of a granular type, that is not finely divided, since the carbons have no function to adsorb coloring matter or other impurities, this property being associated with the carbons of the finely divided type.

It may be stated that in almost every lot or type of adsorption carbon used for water filtration, there is a small amount of fine carbon dust that does not settle but rises to the top of the solution. This fine carbon is relatively inactive, and seems to absorb little if any impregnating agent. This fine material is also relatively inactive as regards chlorine removal. Therefore, its elimination in the present process as above set forth is of substantial advantage, since it removes a contaminant usually found in the adsorption carbons.

The adsorption carbon may be treated in the manner set forth with any of the bacteriostatic agents herein set forth.

It has been found that the treatment of adsorption carbon with a dilute aqueous solution of an aqueous soluble salt of the herein set forth metals which render the carbon bacteriostatic also improves the adsorption capacity of the carbon for chlorine and chloramines which are used for water sterilization, said salts being incapable of imparting properties to the water which inhibits its use in foods or for drinking purposes. It has been found that the best results are obtained using the copper sulfates and chlorides and the cobalt chlorides and sulfates. For example, an adsorption carbon treated with cobalt chloride so as to contain a concentration of adsorbed dry cobalt chloride of 500 parts per million parts by weight of dry adsorption carbon, was tested against an untreated carbon from an identical source. Ten grams of each carbon was then placed in filters and water containing 5 parts per million of chloramine was passed over each carbon. Tests were then made of each 10 cc. increments of the filtrate to determine if any chlorine had not been adsorbed. The results are given in the following table:

EXAMPLE IX

*Comparative affinities for chloramine of treated and untreated carbon*

| Carbon | Cc. of Filtrate Collected and Tested | | | |
|---|---|---|---|---|
| | 50 | 60 | 70 | 80 |
| Untreated | − | + | + | + |
| Treated | − | − | − | − |

NOTE: − denotes absence of chloramine in water after being passed through the carbon; + denotes presence of chloramine in water after being passed through the carbon.

It is highly desirable to use a dilute solution of the metal chloride in water or of any of the other bacteriostatic agents herein set forth in order to avoid excessive concentration of the treatment agent on the surfaces of the carbon. Illustratively, if the carbon is treated with an aqueous solution containing 5% of copper sulfate, the surface of the adsorption carbon treated will adsorb an excessive amount of copper. Therefore, it is preferable to use a large volume of the impregnating solution of the metal sulfate in water to avoid excessive concentration of the metal sulfate in certain layers of the carbon which is treated. For example, if 100 grams of carbon are treated with a solution of copper sulfate and the dry carbon is to contain only a 0.5% solution of copper sulfate, it might be assumed that 100 cc. of a 5% copper solution could be used. However, if a copper solution of this concentration were used, the superficial areas of the adsorption carbon may be too intensely treated. Therefore, it is preferable to use a dilute aqueous solution of the metal sulfate containing between about 0.1% and about 0.5% of the metal sulfate. Similarly, it is preferred to use an aqueous solution of cobalt chloride containing between .01% and .1% of the cobalt chloride, the latter percentage figures when translated into parts per million of the cobalt chloride in aqueous solution being equivalent to between 100 parts and 1,000 parts of the cobalt chloride per million parts of water.

It is desired to point out that in one form of the invention the adsorption carbon may be treated first with a copper sulfate solution, preferably of the dilution herein set forth, and thereafter a very thin and exceedingly dilute solution of the character herein set forth of cobalt chloride or other cobalt compound, passed through the previously treated adsorption carbon to thereby provide an adsorption carbon which has a mixture in which the bacteriostatic compounds furnish the adsorption carbon with a plurality of metal compounds. Where an adsorption carbon has been used to treat water in accordance with the present invention, said adsorption carbon having been impregnated with copper sulfate and the effectiveness of the adsorption carbon to reduce the presence of microorganisms in the water after passing through the carbon has been exhausted, the said carbon may be regenerated by passing therethrough a dilute solution of cobalt chloride or any other aqueous soluble cobalt compound which will furnish on the surfaces of the adsorption carbon a cobalt active medium.

It may be stated that it is quite necessary that the bacteriostatic metals be present in the form of soluble salts, otherwise they will not be properly adsorbed and dispersed on the peripheral areas of the carbon particles.

The atomic weights of the bacteriostatic materials herein set forth are as follows:

| | |
|---|---|
| Aluminum | 26.97 |
| Iron | 55.85 |
| Nickel | 58.69 |
| Cobalt | 58.94 |
| Manganese | 54.93 |
| Copper | 63.57 |
| Zinc | 65.38 |

The expression "a metal having an atomic weight between 54.93 and 63.57" includes the metals iron, nickel, manganese, copper and cobalt.

The copper sulphate used in carrying out the present invention may have small amounts of cobalt sulphate present therein and the copper chloride used in carrying out the present invention may have small amounts of cobalt chloride present therein, the cobalt chloride or the cobalt sulphate being usually present together with the copper sulphate in an amount not greater than 10 to 100 parts per million parts of water.

The present application is a continuation-in-part of application Serial No. 102,704, filed July 1, 1949.

The atomic weights above set forth appear on page 22 of the book entitled "Organic Chemistry Simplified," by Rudolph Macy, Chemical Publishing Company, 1943.

It is preferred to treat water with a chloride salt of the bacteriostatic metals herein referred to due to the fact that most of the waters which are treated are chlorinated and hence, if some of the chloride of the bacteriostatic metal is taken up by the water, the character of the water does not change in respect to the acidic radicals present. When treating chlorinated water, it is preferred to use the chloride salt instead of the sulfate, as the sulfate may under certain circumstances necessarily reduce the affinity of the carbon for the removal of chlorine which is a highly important function in water filtration.

A further example of how the adsorption carbon is prepared will be clear from the following example: the percentage of dry cobalt chloride, for example, on the dry weight of the treated carbon preferably should range from about 400 parts to 2,000 parts per million parts of the dry adsorption carbon, since as a rule there is applied to the carbon treatment solutions varying between 100 and 500 parts per million. As a rule, one pound of dry adsorption carbon is treated with 200 cc. of an aqueous cobalt chloride solution having present between 100 and 500 parts of cobalt chloride per million parts of water. Then one pound of the treated carbon will have adsorbed a cobalt content of approximately 2,000 cc. or 0.2 of a gram per 454 grams of adsorption carbon which would be approximately 400 parts per million of the dry cobalt chloride taken on the weight of the dry adsorption carbon. When one pound of adsorption carbon is treated with 2,000 cc. of an aqueous solution of cobalt chloride in which there are 500 parts of cobalt chloride per million parts of water, there will be a concentration on the surfaces of the dry adsorption carbon of 200 parts of dry cobalt chloride per million parts of dry carbon.

The present invention in one of its forms is also directed to activating bacteriostatic adsorption carbon capable of adsorbing chlorine from liquids containing the same, said carbon having substantially uniformly adsorbed on the particles of the carbon mass copper sulfate having bacteriostatic properties in an amount equivalent to between about 0.5% and 1.5% of the copper sulfate taken on the weight of the dry adsorption carbon, the latter being substantially free of developed colonies of microorganisms.

The aqueous copper sulfate solution used to produce the said activated bacteriostatic adsorption carbon may have a concentration of copper sulfate in an amount between about 0.1% and about 1.0%.

It is desired to point out that the adsorption carbon impregnated with copper sulfate is incapable of imparting properties to the liquid treated inhibiting the potability of the liquid.

What is claimed is:

1. The method comprising filtering water through adsorption carbon having adsorbed thereon the dry aqueous soluble salt of a metal selected from the group of metals consisting of aluminum, iron, copper, nickel, manganese and zinc, said metal salt being in admixture with a dry water soluble cobalt salt, the amount of the latter adsorbed by the adsorption carbon being equivalent to between about 400 and 2,000 parts by weight of the dry cobalt salt per million parts of the dry adsorption carbon, the non-metal radical of each of the salts including the non-metal radical of the cobalt salt having no deleterious effect on the potability of the water.

2. The method of treating water which has been sterilized by treatment with a chlorine containing material comprising passing water through adsorption carbon, the adsorption capacity of the carbon for said chlorine containing material having been increased by the impregnation of the adsorption carbon with an aqueous soluble cobalt salt having an acid radical selected from the group of radicals consisting of chlorine and $SO_4$, the amount of the salt adsorbed by the adsorption carbon being equivalent to about 400 and 2,000 parts of the dry cobalt salt per million parts of the dry adsorption carbon.

3. The method of reducing the ability of the filtering surfaces of activated adsorption carbon to promote the initial colonization and development of microorganisms upon the repeated filtering of a liquid therethrough comprising treating said carbon with a dilute aqueous solution of a salt of a metal having bacteriostatic properties, the salt being present in the aqueous solution in an amount between about 100 parts and 15,000 parts per million parts of water and drying the so-treated activated adsorption carbon, the duration of treatment of the adsorption carbon being such as to provide thereon an adsorption of the salt of the metal having bacteriostatic properties in an amount equivalent to between about 400 and 15,000 parts by weight of the dry salt per million parts by weight of the dry adsorption carbon, the metal of the salt being selected from the group of metals consisting of copper and cobalt, the acid radical of the salt having no deleterious effect on the liquid adapted to be filtered by the so-treated activated adsorption carbon, and retaining said salt of the metal upon the surfaces of the activated adsorption carbon upon repeated filtering of the liquid therethrough.

4. The method of reducing the ability of the filtering surfaces of activated adsorption carbon to promote the initial colonization and development of microorganisms upon the repeated filtering of a liquid therethrough comprising treating said carbon with a dilute aqueous solution of a cobalt salt having bacteriostatic properties, the cobalt salt being present in the aqueous solution in an amount between about 100 parts and 1,000 parts per million parts of water and drying the so-treated activated adsorption carbon, the duration of treatment of the adsorption carbon being such as to provide thereon an adsorption of the cobalt salt having bacteriostatic properties in an amount equivalent to between about 400 and 2,000 parts by weight of the dry cobalt salt per million parts by weight of the dry adsorption carbon, the cobalt salt having no deleterious effect on the liquid adapted to be filtered by the so-treated activated adsorption carbon, and retaining said cobalt salt upon the surfaces of the activated adsorption carbon upon repeated filtering of the liquid therethrough.

5. The method defined in claim 4 in which the salt of the metal in dilute aqueous solution is cobalt chloride.

6. The method of regenerating adsorption carbon which has been impregnated with a solution of a salt of a metal which initially functions to reduce the development of microorganisms in water passing through said adsorption carbon, said metal salt having become inactive to reduce the development of microorganisms, comprising passing through the adsorption carbon containing said inactive inhibitor of microorganism-development, a dilute solution of a soluble cobalt compound and depositing a soluble cobalt salt on the surface of the particles of the adsorption carbon, said cobalt salt activating said adsorption carbon to inhibit the development of microorganisms in water passed through said adsorption carbon.

7. The method of treating an aqueous beverage comprising filtering the aqueous beverage through adsorption carbon which maintains its bacteriostatic properties during repeated filtering and prevents the colonization and development of microorganisms on the surfaces of said adsorption carbon and prevents an increase in the bactericidal content of the beverage, said adsorption carbon having adsorbed from a dilute aqueous solution a dry cobalt salt having bacteriostatic properties, said cobalt salt being retained upon the surfaces of the adsorption carbon upon repeated filtering, said cobalt salt being incapable of imparting properties to the beverage inhibiting its potability.

8. The method of treating chlorinated water comprising filtering the chlorinated water through adsorption carbon which maintains its bacteriostatic properties during repeated filtering and prevents the colonization and development of microorganisms on the surfaces of said adsorption carbon and prevents an increase in the bactericidal content of the water, said adsorption carbon having adsorbed from a dilute aqueous solution the dry cobalt salt having bacteriostatic properties, said cobalt salt being retained upon the surfaces of the adsorption carbon upon repeated filtering, said cobalt salt being incapable of imparting properties to the water inhibiting its potability.

9. The method of treating water containing E-coli bacteria comprising filtering said water through adsorption carbon which maintains its bacteriostatic properties during repeated filtering and prevents the colonization and development of micro-organisms on the surfaces of said adsorption carbon and prevents an increase in the bactericidal content of the water, said adsorption carbon having adsorbed from a dilute aqueous solution the dry salt of a metal having bacteriostatic properties, said metal being selected from the group of metals consisting of copper and cobalt, said salt of the metal being retained upon the surfaces of the adsorption carbon upon repeated filtering, said metal salt being incapable of imparting properties to the water inhibiting its potability.

10. The method of treating an aqueous liquid comprising filtering the aqueous liquid through adsorption carbon which maintains its bacteriostatic properties during repeated filtering and prevents the colonization and development of microorganisms on the surfaces of said adsorption carbon and prevents an increase in the bactericidal content of the liquid, said adsorption carbon having adsorbed from a dilute aqueous solution the dry salt of a metal having bacteriostatic properties in an amount between about 400 and about 15,000 parts by weight of the salt per million parts of the dry adsorption carbon, said metal salt being present in aqueous solution in an amount between 100 parts and 15,000 parts per million parts of water, said metal being selected from the group of metals consisting of copper and cobalt, said salt of the metal being retained upon the surfaces of the adsorption carbon upon repeated filtering, said metal salt being incapable of imparting properties to the liquid inhibiting its potability.

11. The method of treating an aqueous liquid comprising filtering the aqueous liquid through adsorption carbon which maintains its bacteriostatic properties during repeated filtering and prevents the colonization and development of microorganisms on the surfaces of said adsorption carbon and prevents an increase in the bactericidal content of the liquid, said adsorption carbon having adsorbed from a dilute aqueous solution a dry cobalt salt having bacteriostatic properties in an amount between about 400 parts and 2,000 parts by weight of the dry salt per million parts by weight of the dry adsorption carbon, said metal salt being present in the aqueous solution in an amount between 100 parts and 1,000 parts per million parts of water, said cobalt salt being retained upon the adsorption carbon upon repeated filtering of a liquid therethrough, said cobalt salt being incapable of imparting properties to the liquid inhibiting its potability.

12. The method defined in claim 10 in which the metal salt which is adsorbed by the adsorption carbon is a water soluble cobalt salt.

13. The method defined in claim 10 in which the salt of the metal in dilute aqueous solution is a water soluble copper salt.

14. The method defined in claim 11 in which the cobalt salt is cobalt chloride.

15. The activated bacteriostatic adsorption carbon which after repeated filtering of liquids having microorganisms therein is substantially free of developed colonies of microorganisms, said adsorption carbon having substantially uniformly adsorbed on the particles of the carbon mass a water soluble salt of cobalt in an amount equivalent to between about 400 and 2,000 parts by weight of the dry salt per million parts by weight of the adsorption carbon, said adsorption carbon being capable of adsorbing chlorine from liquids and incapable of imparting properties to the liquid inhibiting its potability.

16. The activated adsorption carbon set forth in claim 15 in which the cobalt salt is cobalt chloride.

17. The activated bacteriostatic adsorption carbon which after repeated filtering of liquids having microorganisms therein is substantially free of developed colonies of microorganisms, said adsorption carbon having substantially uniformly adsorbed on the particles of the carbon mass a water soluble salt of cobalt in an amount equivalent to between about 400 and 2,000 parts by weight of the dry salt per million parts by weight of the adsorption carbon, said adsorption being from a dilute aqueous solution having the metal salt present in an amount between 100 parts and 1,000 parts per million parts of water, said adsorption carbon being capable of adsorbing chlorine from liquids and incapable of imparting properties to the liquid inhibiting its potability.

18. The actvated adsorption carbon set forth in claim 17 in which the metal salt is cobalt chloride.

19. The activated bacteriostatic adsorption carbon capable of adsorbing chlorine from liquids containing the same, said carbon having substantially uniformly adsorbed on the particles of the carbon mass copper sulfate having bacteriostatic properties in an amount equivalent to between about 0.5% and about 1.5% of the copper sulfate taken on the weight of the dry adsorption carbon, the latter being substantially free of developed colonies of microorganisms.

20. The activated bacteriostatic adsorption carbon which after repeated filtering of liquids having microorganisms therein is substantially free of developed colonies of organisms, said carbon having been treated with an aqueous solution having present copper sulfate in an amount between about 0.1% and about 1.0%, said adsorption carbon having uniformly adsorbed on the particles of the carbon mass copper sulfate having bacteriostatic properties in an amount equivalent to between about 0.5% and about 1.5% of dry copper sulfate taken on the weight of the dry adsorption carbon, said impregnated adsorption carbon being incapable of imparting properties to the liquid inhibiting its potability.

References Cited in the file of this patent

UNITED STATES PATENTS

| | | |
|---|---|---|
| 1,197,640 | Kriegsheim | Sept. 12, 1916 |
| 1,519,470 | Wilson | Dec. 16, 1924 |
| 1,993,761 | Tippins | Mar. 12, 1935 |
| 2,105,835 | Krause | Jan. 18, 1938 |
| 2,210,966 | Urbain | Aug. 13, 1940 |
| 2,253,762 | Carswell et al. | Aug. 26, 1941 |

FOREIGN PATENTS

| | | |
|---|---|---|
| 577,862 | Great Britain | June 4, 1946 |
| 672,744 | France | Sept. 23, 1929 |
| 692,023 | Germany | June 11, 1940 |
| 757,173 | France | Oct. 9, 1933 |

OTHER REFERENCES

J. Indian Chem. Society, Ind. and News Edition, 4, pages 236–8, 1942.

Chemical Abstracts, vol. 36, 1942, page 4002.

Chemical Abstracts, vol. 40, page 7280, 1946.

Hackh's Chemical Dictionary, by Grant, 3rd edition, 1944, page 549.